United States Patent [19]

Prukop

[11] Patent Number: 5,401,425
[45] Date of Patent: Mar. 28, 1995

[54] RECOVERING ENHANCED OIL RECOVERY SURFACTANTS BY TEMPERATURE CYCLING

[75] Inventor: Gabriel Prukop, Orchard Point, Singapore

[73] Assignee: Texaco Inc., White Plains, N.Y.

[21] Appl. No.: 245,051

[22] Filed: May 16, 1994

Related U.S. Application Data

[63] Continuation-in-part of Ser. No. 840,248, Feb. 24, 1992, abandoned.

[51] Int. Cl.⁶ .......................... E21B 43/22; E21B 43/40
[52] U.S. Cl. ..................................... 507/200; 252/331; 252/348; 166/266; 507/254; 507/255; 507/261; 507/936; 507/937
[58] Field of Search ............... 252/8.551, 8.554, 331, 252/348; 166/266

[56] References Cited

U.S. PATENT DOCUMENTS

| | | | |
|---|---|---|---|
| 2,243,330 | 5/1941 | De Groote et al. | 252/331 |
| 2,317,726 | 4/1943 | Boedeker et al. | 252/331 |
| 2,518,668 | 8/1950 | De Groote et al. | 252/340 |
| 2,754,271 | 7/1956 | Kirkpatrick | 252/331 |
| 3,301,328 | 1/1967 | Campion | 166/42 |
| 3,553,149 | 1/1971 | Schoen et al. | 252/340 |
| 4,277,352 | 7/1981 | Allison et al. | 252/8.554 |
| 4,306,981 | 12/1981 | Blair, Jr. | 252/8.554 |
| 4,309,306 | 1/1982 | Blair, Jr. | 252/358 |
| 4,316,808 | 2/1982 | Blair, Jr. | 252/8.554 |
| 4,411,814 | 10/1983 | Burkhardt | 252/344 |
| 4,502,959 | 5/1985 | Hansen | 210/705 |
| 4,513,820 | 4/1985 | Maddox, Jr. | 166/266 |
| 4,516,635 | 5/1985 | Maddox, Jr. | 166/266 |
| 4,518,038 | 5/1985 | Maddox, Jr. et al. | 166/266 |
| 4,559,148 | 12/1985 | Ashrawi et al. | 252/8.554 |

OTHER PUBLICATIONS

"Petroleum (Refinery Processes, Survey)" in: *Kirk-Othmer Encyclopedia of Chemical Technology* (1981 ed.), vol. 17, pp. 195, 198–199 Ref. TP9.E68.

*Primary Examiner*—Gary Geist
*Attorney, Agent, or Firm*—Kenneth R. Priem; James L. Bailey; Harold J. Delhommer

[57] ABSTRACT

A method for recovering surfactants from produced fluids by mixing with produced fluids about 0.1% to about 5% of a nonionic surfactant having a phase inversion temperature above the temperature of the produced fluids, heating the mixture above the phase inversion temperature, mixing the phase containing oil and the surfactants with water, and cooling the mixture below the phase inversion temperature to extract the surfactants into an aqueous phase, provided that if a sufficient concentration of the nonionic surfactant is already in the produced fluids, it need not be added.

13 Claims, No Drawings

RECOVERING ENHANCED OIL RECOVERY SURFACTANTS BY TEMPERATURE CYCLING

This application is a continuation-in-part of application Ser. No. 07/840,248, filed Feb. 24, 1992, now abandoned.

BACKGROUND OF THE INVENTION

This invention relates to the recovery and reutilization of surfactants from fluids that are produced as a result of enhanced oil recovery operations. More particularly, the invention employs temperature cycling to extract surfactants first into an oleic phase, and then into an aqueous phase.

Surfactants flooding has become one of the more promising enhanced oil recovery techniques for recovering oil after waterflooding. Generally, the method of surfactant flooding employs the injection of a surfactant in an aqueous solution or emulsion to sweep through the formation and recover oil. This may be followed by a polymer solution for mobility control and improved sweep efficiency. It is believed that surfactants are effective because of their ability to reduce the interfacial tension between crude oil and water. This reduction of interfacial tension permits the creation of various oil, water and surfactant emulsions in the formation. Thus, produced fluids comprise one or more oil, water and surfactant emulsions, and oil and brine which may or may not contain surfactant.

Because of the relative amounts of oil and water produced in chemical flooding, produced emulsions are frequently oil-in-water emulsions. Upon settling, the composition of the produced fluids may change to different types of emulsions, as well as separate oil and water phases containing different amounts of surfactants. Numerous methods have been devised to break water-in-oil emulsions, oil-in-water-emulsions, and to aid in phase separation of produced fluids.

Two methods of recovering surfactants from produced emulsions of oil, water and surfactant are disclosed in U.S. Pat. Nos. 4,516,635 and 4,559,148. U.S. Pat. No. 4,516,635 employs a two-step extraction process with a first extracting compound selected from the group of alkali metal salts and ammonium salts of various alkylbenzene sulfonates to form three phases, a crude oil phase, a first middle phase and an aqueous phase. The second extraction step mixes an alkanol having 2 to 4 carbon atoms with the first middle phase to form three additional phases, including a surfactant rich, second middle phase.

U.S. Pat. No. 4,559,148 discloses mixing a produced emulsion with an alkali metal chloride salt and butanol or pentanol and allowing the fluids to separate into two phases, an oleic phase and an aqueous phase. The oleic phase is mixed with fresh water containing about 1% to about 10% by weight of isopropanol, ethanol or methanol, and the mixture is allowed to separate into at least two phases, a substantially water-free and surfactant-free crude oil phase and an aqueous phase containing virtually all of the surfactants originally within the produced emulsion.

U.S. Pat. No. 4,277,352 teaches the addition of anionic or nonionic solubilizers including alkoxylated alkylphenols to produced emulsions to shift the enhanced oil recovery surfactants from emulsions into aqueous solutions.

Other emulsion breaking processes are disclosed in U.S. Pat. Nos. 3,637,521; 3,687,845; 4,029,570; 4,073,344; 4,216,079; and 4,261,812. This is not an exhaustive list.

SUMMARY OF THE INVENTION

The present invention is a method for recovering enhanced oil recovery surfactants from produced fluids by using temperature to manipulate the phase environment of the produced fluids. In one embodiment, the invention comprises mixing about 0.1% to about 5% by weight of a nonionic surfactant or an ionic surfactant having a nonionic hydrophile with fluids produced from an enhanced oil recovery surfactant flood. The surfactant must have a phase inversion temperature above the temperature of the produced fluids. The mixture of produced fluids and surfactant is heated above the phase inversion temperature of the nonionic surfactant to extract the enhanced oil recovery surfactants and surfactant into a phase containing oil such as an oil phase or midphase. The oil phase containing the surfactants is then separated from the other produced fluids and mixed with water.

In the second extraction step, the mixture of water and the oil phase containing the surfactants is cooled below the phase inversion temperature of the nonionic surfactant or ionic surfactant having a nonionic hydrophile to extract all of the surfactants into an aqueous phase. The aqueous phase containing the enhanced oil recovery surfactants and the surfactant is then separated from other fluid phases. Depending upon circumstances, this surfactant containing aqueous phase may be further blended or used as is in a surfactant flood.

A second embodiment of the invention is practiced when the produced fluids contain sufficient nonionic surfactant or ionic surfactant having a nonionic hydrophile with the proper phase inversion temperature. In such a case, it is not necessary to mix the surfactant with the produced fluids since it is already present. All other steps of the invention remain the same.

DETAILED DESCRIPTION

Surfactant flooding is usually performed under conditions in which the surfactant is injected in or near a three-phase environment (Type III). This means that the salinity, temperature, surfactant concentration (usually of several different surfactants), and other conditions are such that the surfactant solution, when mixed with the oil and allowed to equilibrate, would tend to separate into three phases. The phases would be an upper, substantially pure oil phase, a middle micellar phase of oil, brine and surfactant, and a lower phase of brine. Usually, this Type III phase regime is the environment for the lowest interfacial tension between the oil and water. Such systems usually give the highest oil recovery.

During the course of flooding the reservoir, the surfactant solution is diluted by reservoir fluids and fresh water from the polymer drive. These effects cause a phase transition from the Type III environment to a two-phase environment where the surfactant is predominantly in the water phase (Type II- phase regime).

During production, the fluids may be produced as several kinds of emulsions and/or mixtures of different components. Depending upon the reservoir and surfactant system, recovery of the oil, much less surfactant recovery and recycle, may be difficult. Because of the economics of surfactant flooding, i.e., the cost of the surfactants utilized, it is highly desirable to officially recover the enhanced oil recovery surfactants for later reuse. Efficient and low cost surfactant recovery may also permit the use of higher and more effective surfactant concentrations in the flooding systems instead of the less effective and frequently unaffordable concentrations in use today.

Certain surfactants, in particular nonionic surfactants and ionic surfactants which contain nonionic hydrophiles, exhibit partitioning behavior which is temperature dependent. Ionic surfactants are substantially less sensitive to temperature. In general, surfactant blends exhibit properties which are a weighted average of component properties. The surfactant components also tend to transfer from one liquid phase to another as a collective group. Thus, surfactant systems containing temperature dependent nonionic surfactants or ionic surfactant systems to which temperature dependent nonionic surfactants are added, are beneficial for surfactant recovery. Such recovery may be achieved with temperature cycling according to the instant invention.

The invention may be practical in either a batch or continuous manner. It is a method for recovering enhanced oil recovery surfactants from produced fluids which comprises a multiple step method with two extractions. First, about 0.1% to about 5%, preferably about 0.3% to about 1% by weight of a nonionic surfactant or ionic surfactant having a nonionic hydrophile is mixed with fluids produced from an enhanced oil recovery surfactant flood. The surfactant must have a phase inversion temperature above the temperature of the produced fluids. The phase inversion temperature is the temperature at which the solubility of the surfactant changes from aqueous to oleic or vise versa. The mixture of produced fluids and the surfactant is heated above the phase inversion temperature of the surfactant to extract the enhanced oil recovery surfactants along with the nonionic surfactant or ionic surfactant having a nonionic hydrophile into a phase containing oil such as an oil phase or midphase. The phase containing oil is then separated from the other produced fluids.

In the second extraction, water is mixed with the phase containing oil and the surfactants, and the mixture is cooled below the phase inversion temperature of the nonionic surfactant or ionic surfactant having a nonionic hydrophile to extract the enhanced oil recovery surfactants and additional surfactant into an aqueous phase. This aqueous phase containing the enhanced oil recovery surfactants and nonionic surfactant or ionic surfactant having a nonionic hydrophile is then separated from the other fluid phases.

As in any separation and extraction process, it is desirable to reduce the volume of fluids subject to the process. One simple step which may be followed is to initially separate most of the oil from the produced fluids prior to mixing the surfactant with the remaining produced fluids. Numerous extraction methods known in the art may be employed prior to beginning the invention method to break difficult emulsions and to lower the volume of produced fluids subjected to the invention method.

Another embodiment of the instant invention lies in using a nonionic surfactant or ionic surfactant having a nonionic hydrophile having a phase inversion temperature above the temperature of the produced fluids in the original enhanced oil recovery surfactant flood. If a sufficient amount of the temperature dependent nonionic surfactant or ionic surfactant having a nonionic hydrophile is in the produced fluids, it will be unnecessary to add additional surfactant to the produced fluids to practice the invention.

In production from chemical floods, the surfactant usually is in the brine phase. When an appropriate nonionic surfactant or ionic surfactant having a nonionic hydrophile, said surfactant having a phase inversion temperature above the production temperature is added to the produced fluids and the mixture of fluids is heated above the inversion temperature, the surfactant system collectively partitions into the oil phase or a midphase. The phases can then be separated and the surfactant-free brine discarded. The oil or midphase containing the surfactant is then mixed with water, preferably ambient temperature water, and allowed to cool and separate. Because of the effect of salinity on these phase regimes, this extraction is enhanced by the use of a relatively fresh brine having a salinity below about 1000 ppm TDS (total dissolved solids). The temperature shift to below the phase inversion temperature makes the surfactant system water soluble again. The surfactant is recovered in the new aqueous phase and is ready for reformulation and subsequent injection into the same or another formation. Although it may vary substantially, the volume of water added in the second extraction step is preferably about equal to or less than the volume of the oil phase containing the surfactants from the first extraction step.

The invention may be practiced with nonionic surfactants and ionic surfactants having a nonionic hydrophile. These ionic surfactants such as alkoxylated sulfates or alkoxylated sulfonates with the proper phase inversion temperature may be used in the invention method. Preferred nonionic surfactants are alkoxylated alkylphenols which may be ethoxylated and propoxylated, or ethoxylated or propoxylated. Most preferred are alkylphenols with about 4 to about 12 ethylene oxide groups and about 5 to about 12 carbon atoms in their alkyl chains.

During an appropriate settling time of about 30 to about 60 minutes, which may be considerably shorter or longer depending on conditions, most of the surfactants will partition to the oleic phase in the first extraction. A similar settling time of about 30 to about 60 minutes may also be required for effective extraction into the aqueous phase during the second extraction step.

It should be noted that liquids may not settle into separate distinct phases all of the time. At times, there may be a small boundary area between two phases which does not distinctly belong to either phase. Sometimes a complete separation into the phases may take days. Thus, whenever the words "separate" and "separation" are used herein, they refer to a separation that is preponderantly complete.

The surface active agents extracted may be the commonly used anionic surfactants such as petroleum sulfonates, cationic surfactants or nonionic surfactants. More specifically, the inventive method extracts surfactants such as alkylaryl sulfonates, alkoxylated alkylphenol sulfonates, alkoxylated alkylphenol sulfates, and alkoxylated sulfonated or sulfated alcohols.

Other materials which may be present in the produced emulsions are various viscosifiers such as biopolymers and synthetic polymers, e.g., polysaccharides and polyacrylamides. Salts which occur naturally in the formation or were added to the flooding water may be present. Additionally, the invention process is also effective in extracting surfactants from emulsions which contain various solubilizers, usually added to enhance surfactant solubility. The solubilizers include the water soluble alcohols, polyhydric alcohols, ether alcohols, alkoxylated phenols and alkoxylated alkylphenols, alkoxylated alcohols, polyalkoxylated mercaptans, as well as sulfated or sulfonated derivatives of the alkoxylated phenols or the alkoxylated alcohols.

Produced emulsions will normally be in the form of oil-in-water emulsions and water-in-oil emulsions. Many times, an oil-in-water emulsion will separate over time with the aid of gravity to a water-in-oil emulsion and an aqueous phase. Oil soluble sulfonate surfactants usually speed up this process.

Certain pretreatment steps may be optionally employed to improve the extraction and concentration of the surfactants. Separation by gravity of the produced emulsion in the predominantly oily and aqueous phases will reduce the volume of produced oil emulsion to be treated by the extraction method. Likewise, the employment of a heater treater or similar apparatus to process a produced emulsion prior to the extraction method will also substantially reduce the volume of the emulsion to be treated as well as improve the efficiency of the extraction method. Third, the addition of oil soluble, high equivalent weight surfactants to the produced emulsion may also significantly aid gravity separation in reducing oily emulsion volume. Sulfonate surfactants which tend to be oil soluble and have an average equivalent weight within the range of about 400 to about 600 are especially preferred for pretreatment of the produced emulsions.

The lowest effective concentration of extracting nonionic surfactant or ionic surfactant having a nonionic hydrophile required also varies substantially with the concentration of surfactants in the produced emulsion, the treating temperature, the salinity of the produced emulsion, and the types and concentrations of solubilizers and surfactants in the produced emulsion. For example, a higher concentration of extracting surfactant is required as surfactant concentration in the produced emulsion increases (generally with increasing emulsion stability). Higher brine salinities and increased divalent ion concentrations may require lower concentrations.

The following examples further illustrate the novel surfactant extraction and recovery method of the present invention. These examples are given by way of illustration and not as limitations in the scope of the invention. Thus, it should be understood that the steps and materials employed in the instant method may be varied to achieve similar results within the scope of the invention.

EXAMPLE 1

A surfactant system identical to that developed by Texaco for the Salem, Illinois surfactant pilot was prepared with the concentration of 1.8% by weight TRS-18, 1.8% by weight TRS-40 and 1.4% by weight LN-60COS in a brine of 68,000 ppm TDS with a divalent ion content of about 4000 ppm. TRS-18 is a trademarked oil soluble sulfonate surfactant sold by Witco Chemical Co. having an average equivalent weight of about 500. TRS-40 is a trademarked water-soluble sulfonate sold by Witco Chemical Co. having an average equivalent weight of about 300. LN-60COS is a trademarked sulfated derivative of an ethoxylated alcohol having about 12 to 14 carbon atoms with about six units of ethylene oxide supplied by Texaco Chemical Co. having an average equivalent weight of about 550.

This surfactant system was diluted to 1/10 of its concentration in an attempt to more accurately represent produced fluids. An equal volume of Salem, Illinois crude having a density of 0.84 gr/mm and a viscosity of about 6.4 centipoise was mixed with the surfactant. An ethoxylated nonylphenol (nonionic surfactant) having an average ethoxylation of 8.5 moles of ethylene oxide per molecule was then added to the mixture in a concentration of about 0.5%. Equilibration at 23° C. yielded a murky lower phase. Heating to 35° C., which was above the phase inversion temperature of the ethoxylated nonylphenol, produced a clear lower brine phase. This indicated that the heating above the phase inversion temperature had transferred the surfactants into the oil phase.

EXAMPLE 2

The same 5% surfactant system of Example 1 was again diluted by a factor of 10 to produce a 0.5% anionic surfactant system. To this system was added a nonionic surfactant solution comprising 0.4% of the ethoxylated nonylphenol of Example 1 and 0.1% of an ethoxylated nonylphenol having an average of six ethylene oxide groups per molecule. The dilution water for the nonionic solution was a brine having a salinity of about 34,000 ppm TDS and a divalent ion content of about 2000 ppm. This surfactant system had 12.8 meq/l of anionic surfactant.

10 ml of the above surfactant system was mixed with 4 ml of the crude oil of Example 1. After equilibrium at 22° C., the brine phase of 6.3 ml contained 12.1 meq/l of anionic surfactant. Raising the temperature to 60° C. and separating the phases yielded 7.1 ml of brine in which no anionic surfactant was detected. This brine was discarded. The oil phase was mixed with 7.1 ml of fresh water and allowed to equilibrate at 22° C. The resulting aqueous phase contained 12.0 meq/l of recovered anionic surfactant. Anionic surfactant recovery was over 90%.

Many other variations and modifications may be made in the concept described above by those skilled in the art without departing from the concepts of the present invention. Accordingly, it should be clearly understood that the concepts disclosed in the description are illustrative only and are not intended as limitations on the scope of the invention.

What is claimed is:

1. A method for recovering enhanced oil recovery surfactants from produced fluids, which comprises:
  mixing about 0.1% to about 5% by weight of an extracting surfactant with fluids produced from an enhanced oil recovery surfactant flood, said extracting surfactant having a phase inversion temperature above the temperature of the produced fluids and selected from the group consisting of nonionic surfactants and ionic surfactants having a nonionic hydrophile;
  heating the mixture of produced fluids and said extracting surfactant above the phase inversion temperature of said extracting surfactant to extract enhanced oil recovery surfactants into a phase containing oil;
  separating the phase containing oil, the enhanced oil recovery surfactants and said extracting surfactant from other produced fluids;
  mixing water with the phase containing oil and the surfactants;

cooling the mixture of water and the phase containing oil and surfactants below the phase inversion temperature of said extracting surfactant to extract the enhanced oil recovery surfactants and said extracting surfactant into an aqueous phase; and separating the aqueous phase containing the enhanced oil recovery surfactants and said extracting surfactant from other fluid phases.

2. The method of claim 1, wherein the enhanced oil recovery surfactant in the produced fluids includes a nonionic surfactant.

3. The method of claim 1, wherein about 0.3% to about 1% by weight of an extracting surfactant is mixed with the produced fluids.

4. The method of claim 1, wherein the phase containing oil to which the enhanced oil recovery surfactants are extracted is a midphase.

5. The method of claim 1, wherein the water mixed with the phase containing oil and the surfactants is a brine having a salinity below about 1000 ppm TDS.

6. The method of claim 1, wherein said extracting surfactant is an ethoxylated or propoxylated alkylphenol.

7. The method of claim 6, wherein said alkylphenol has about 4 to about 12 ethylene oxide groups and about 5 to about 12 carbon atoms in its alkyl chain.

8. The method of claim 1, wherein said extracting surfactant is an ethoxylated and propoxylated alkylphenol.

9. The method of claim 1, wherein said extracting surfactant is an alkoxylated sulfate or sulfonate.

10. The method of claim 1, further comprising separating relatively most of the oil from the produced fluids prior to mixing said extracting surfactant with the remaining produced fluids.

11. A method for recovering enhanced oil recovery surfactants from produced fluids, which comprises:

separating relatively most of produced oil from fluids produced from an enhanced oil recovery surfactant flood to leave remaining produced fluids;

mixing about 0.3% to about 1% by weight of an ethoxylated alkylphenol surfactant with the remaining produced fluids, said alkylphenol surfactant having about 4 to about 12 ethylene oxide groups, about 5 to about 12 carbon atoms in its alkyl chain, and a phase inversion temperature above the temperature of the produced fluids;

heating the mixture of produced fluids and said alkylphenol surfactant above the phase inversion temperature of said alkylphenol surfactant to extract enhanced oil recovery surfactants into a phase containing oil;

separating the phase containing oil, the enhanced oil recovery surfactants and said alkylphenol surfactant from other produced fluids;

mixing water having a salinity below about 1000 ppm TDS with the phase containing oil and the surfactants;

cooling the mixture of water and the phase containing oil and surfactants below the phase inversion temperature of said alkylphenol surfactant to extract the enhanced oil recovery surfactants and said alkylphenol surfactant into an aqueous phase; and separating the aqueous phase containing the enhanced oil recovery surfactants and said alkylphenol surfactant from other fluid phases.

12. A method for recovering enhanced oil recovery surfactants from produced fluids wherein the enhanced oil recovery surfactants include a nonionic surfactant or ionic surfactant having a nonionic hydrophile, said surfactant having a phase inversion temperature above the temperature of the produced fluids, which comprises:

heating produced fluids comprising water, oil and enhanced oil recovery surfactants including about 0.1% to about 5% by weight of said surfactant having a phase inversion temperature above the temperature of the produced fluids, said heating continued until the temperature of the produced fluids is above the phase inversion temperature of said surfactant to extract enhanced oil recovery surfactants into a phase containing oil;

separating the phase containing oil and the enhanced oil recovery surfactants from other produced fluids;

mixing water with the phase containing oil and the surfactants;

cooling the mixture of water and the phase containing oil and the surfactants below the phase inversion temperature of said surfactant to extract the enhanced oil recovery surfactants into an aqueous phase; and separating the aqueous phase containing the enhanced oil recovery surfactants from other fluid phases.

13. The method of claim 12, wherein said nonionic surfactant or ionic surfactant having a nonionic hydrophile is an ethoxylated alkyphenol having about 4 to about 12 ethylene oxide groups and about 5 to about 12 carbon atoms in its alkyl chain.

* * * * *